United States Patent
Jobling et al.

(10) Patent No.: US 12,039,819 B2
(45) Date of Patent: *Jul. 16, 2024

(54) DYNAMIC IDENTITY VERIFICATION SYSTEM AND METHOD

(71) Applicant: International Consolidated Airlines Group, S.A., Madrid (ES)

(72) Inventors: Daniel Jobling, Middlesex (GB); Glenn Morgan, Middlesex (GB); Harvey Tate, Middlesex (GB)

(73) Assignee: International Consolidated Airlines Group, S.A., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,544

(22) Filed: Sep. 19, 2022

(65) Prior Publication Data

US 2023/0016773 A1 Jan. 19, 2023

Related U.S. Application Data

(63) Continuation of application No. 15/754,971, filed as application No. PCT/EP2016/070131 on Aug. 25, 2016, now Pat. No. 11,450,164.

(30) Foreign Application Priority Data

Aug. 25, 2015 (GB) ...................... 1515110

(51) Int. Cl.
G06F 21/31 (2013.01)
G07C 9/25 (2020.01)

(52) U.S. Cl.
CPC ............. *G07C 9/257* (2020.01); *G06F 21/31* (2013.01)

(58) Field of Classification Search
None
See application file for complete search history.

(56) References Cited

U.S. PATENT DOCUMENTS 6,338,041 B1 1/2002 Kawamata
6,819,219 B1 * 11/2004 Bolle ............... G06Q 20/40145
340/5.82

(Continued)

OTHER PUBLICATIONS

Author: Jessica Plautz, Title: How your phone could help speed you through New York City's busiest airport; Date: Aug. 5, 2015, Publisher: https://mashable.com/archive/jfk-terminal-4#YvdmzyFqTaqq, Pertinent Pages: whole document (Year: 2015).*

*Primary Examiner* — Muhammad Adnan
(74) *Attorney, Agent, or Firm* — Sterne, Kessler, Goldstein & Fox P.L.L.C.

(57) ABSTRACT

Systems and methods for dynamic identity verification are disclosed. In an embodiment, a computer-implemented method is provided for verifying the identity of an entity associated with a mobile device. A location of the mobile device along a predefined travel path of the entity is determined from data identifying an interaction between the mobile device and at least one device located at a respective point along the travel path. An assurance level of the entity is determined, wherein the assurance level is adjusted based on the determined location or in the absence of receiving data identifying an interaction over a predefined time window. The identity of the entity is verified if the determined assurance level meets a defined threshold.

14 Claims, 9 Drawing Sheets

(56) References Cited

U.S. PATENT DOCUMENTS

| | | | | |
|---|---|---|---|---|
| 7,218,202 B2* | 5/2007 | Bacchiaz | ............ | G07C 9/00563 340/5.52 |
| 7,243,845 B2* | 7/2007 | Cash | ............ | G06Q 10/08 235/384 |
| 7,327,262 B2* | 2/2008 | Motteram | ............ | G06Q 10/06 340/8.1 |
| 7,737,861 B2* | 6/2010 | Lea | ............ | G01S 13/75 340/8.1 |
| 9,398,795 B2* | 7/2016 | Gupta | ............ | A45C 13/18 |
| 9,703,938 B2* | 7/2017 | Asghari-Kamrani | ............ | G06Q 20/3823 |
| 9,894,477 B1* | 2/2018 | Low | ............ | H04W 4/021 |
| 10,380,814 B1* | 8/2019 | Mathiesen | ............ | G07C 9/253 |
| 10,534,956 B1* | 1/2020 | Trelin | ............ | G06Q 90/20 |
| 10,580,243 B2* | 3/2020 | Harding | ............ | G07C 9/37 |
| 10,750,316 B2* | 8/2020 | Low | ............ | H04W 4/021 |
| 2003/0093187 A1* | 5/2003 | Walker | ............ | B64D 45/0059 701/1 |
| 2003/0137435 A1* | 7/2003 | Haddad | ............ | G08G 1/127 340/994 |
| 2003/0210139 A1 | 11/2003 | Brooks et al. | | |
| 2003/0225612 A1 | 12/2003 | DeSimone et al. | | |
| 2004/0083394 A1* | 4/2004 | Brebner | ............ | G06Q 20/382 726/19 |
| 2004/0153656 A1* | 8/2004 | Cluts | ............ | H04L 9/40 713/186 |
| 2006/0279422 A1 | 12/2006 | Sweatte | | |
| 2007/0122011 A1* | 5/2007 | Takizawa | ............ | G07C 9/10 382/118 |
| 2007/0133844 A1* | 6/2007 | Waehner | ............ | G06V 10/145 382/118 |
| 2007/0273514 A1 | 11/2007 | Winand et al. | | |
| 2009/0128284 A1* | 5/2009 | Floyd | ............ | G07C 9/10 340/5.31 |
| 2009/0284343 A1* | 11/2009 | Ambrefe, Jr. | ............ | G07C 9/25 340/5.2 |
| 2010/0008544 A1* | 1/2010 | Abe | ............ | G06F 21/32 382/190 |
| 2010/0097470 A1* | 4/2010 | Yoshida | ............ | H04N 19/142 375/E7.076 |
| 2010/0185574 A1 | 7/2010 | Skatter | | |
| 2010/0308108 A1* | 12/2010 | Choi | ............ | G07C 9/27 235/382 |
| 2011/0267192 A1* | 11/2011 | Goldman | ............ | G06Q 10/107 340/568.1 |
| 2013/0234849 A1* | 9/2013 | Gupta | ............ | G06Q 10/0833 340/539.11 |
| 2014/0062651 A1 | 3/2014 | Sweatte | | |
| 2014/0176328 A1* | 6/2014 | Koushik | ............ | G06Q 10/08 340/539.13 |
| 2014/0289833 A1 | 9/2014 | Briceno et al. | | |
| 2015/0185022 A1* | 7/2015 | Yoo | ............ | H04W 4/024 701/408 |
| 2015/0339912 A1* | 11/2015 | Farrand | ............ | G08B 25/006 340/501 |
| 2016/0080390 A1* | 3/2016 | Kalb | ............ | G06Q 50/01 726/4 |
| 2016/0189132 A1* | 6/2016 | Cash | ............ | G06Q 20/3224 705/14.57 |
| 2016/0217663 A1* | 7/2016 | Shichiri | ............ | G07C 9/15 |
| 2017/0156124 A1* | 6/2017 | Ashley, Jr. | ............ | G07C 9/28 |
| 2019/0080060 A1* | 3/2019 | Lee | ............ | H04L 63/083 |
| 2019/0385395 A1* | 12/2019 | Kunieda | ............ | G07C 9/10 |
| 2020/0051349 A1* | 2/2020 | Campbell | ............ | H04L 63/107 |
| 2020/0211309 A1 | 7/2020 | Jobling et al. | | |

* cited by examiner

DYNAMIC IDENTITY VERIFICATION SYSTEM AND METHOD

FIELD OF THE INVENTION

The present invention relates to security systems, and more particularly to data processing systems and methods for dynamic control based on identity.

BACKGROUND OF THE INVENTION

Identity and the data associated with identity are typically used for several purposes to facilitate verification and/or authentication of a passenger in a travel environment. For example, air travel typically include checks by:
- Airline sub-systems, to make sure the passenger is who they say they are and to allow the passenger to drop off their baggage, permit them airside (check-in), access lounges, and to board the aircraft.
- Aviation Security sub-systems, usually performed by the airport and airport terminal sub-systems, such as passenger security screening before passengers are permitted airside.
- Immigration sub-systems, both on exit and entry in to a country; the immigration service will need to identify the person and then assess their immigration status.
- Customs sub-systems, to assess whether a passenger is taking contraband into or out of the country.

However, such existing sub-systems are typically implemented independent of other sub-systems in the travel environment. What is desired are improved systems that provide a more flexible, efficient and robust service, to facilitate a more streamlined and seamless passenger experience.

STATEMENT OF THE INVENTION

Aspects of the present invention are set out in the accompanying claims.

According to one aspect, the present invention provides a computer-implemented method for controlling a security system, comprising receiving interaction data from one or more external systems associated with predefined stages of a passenger's travel path, the interaction data indicative of interaction by the passenger with said one or more external systems; storing and updating data defining an assurance level of the passenger, wherein the assurance level is increased in response to receiving said interaction data, and wherein the assurance level is decreased in the absence of receiving interaction data within a predefined elapsed time; receiving data identifying a request from a security system, the request including data identifying the passenger; and responsive to said request, generating and outputting a control signal to the security system in dependence on the stored assurance level of the identified passenger.

In an example, a system for identity-based control is described, comprising one or more computing modules configured to: maintain data defining a dynamic assurance level associated with a user, the dynamic assurance level being updated based on received interaction data associated with predefined stages of a travel path, receive and process a request to authenticate the user, generate an authentication response based on the dynamic assurance level associated with the user, and output a control signal based on the authentication response. The request to authenticate the passenger may be received from an identity service subscriber.

The system may be operable to increase the dynamic assurance level in response to received interaction data associated with at least one predefined point along the travel path. The system may be further operable to decrease the dynamic assurance level after a predefined amount of time has elapsed from receiving interaction data associated with at least one predefined point along the travel path.

The request to authenticate the passenger may be received from an access control system comprising access means to direct the passenger to one of a plurality of channels. The at least one control signal may be operable to control the access means. The access means may comprise a gate or barrier. At least one of the channels may be configured to direct the passenger to a computing terminal operable to receive request additional interaction data from the passenger. The system may be operable to receive and process the additional data from at least one mobile device via the computing terminal, to verify a predefined point along the travel path. The at least one control signal may be further operable to control output means to output image and/or audio data to direct the passenger to a designated travel path.

The system may be further operable to identity one of the predefined points along the travel path based on the received interaction data. The system may be further operable to determine the dynamic assurance level as a maximum assurance threshold level of the passenger, based on the identified point along the travel path. The system may be further operable to identify a minimum threshold level of the received request, compare the minimum threshold level of the received request and the maximum assurance threshold of the passenger, and generate the authentication response based on the comparison. The received request may be associated with a plurality of threshold levels.

The interaction data may be received from at least one of a plurality of data sources comprising one or more databases, one or more data processing servers, one or more computing systems, one or more mobile devices associated with the passenger, and one or more external data sources. The external data sources may be associated with one or more third party services.

The passenger may be on a travel path including a flight from a departure airport terminal, and the plurality of data sources may include passenger and flight data stored in one or more databases, and at least one computing system associated with the departure airport terminal. The system may be further configured to determine the travel path based on the passenger data and flight data associated with the flight.

The system may be further configured to receive interaction data from the one or more external data sources via respective application programming interfaces and/or data subscription interfaces.

In another example, a system for maintaining an assurance level of a passenger is described, wherein the assurance level is increased based on received interaction data associated with predefined stages of a travel path associated with the passenger, and wherein the assurance level is decreased in the absence of interaction data received within a predefined elapsed time, whereby a sub-system is controlled based on the assurance level. The sub-system may be an access control sub-system of an airport terminal, comprising one or more controller modules for controlling respective one or more control mechanisms.

In yet another example, a system for providing identity authentication is described, comprising a database storing assurance data associated with a registered passenger based on an assured point along a travel path, and an identity request handler operable to generate a response to a request for authentication of the passenger based on said assurance data. The assured point along the travel path may be determined based on interaction data associated with the registered passenger received from one or more data sources.

In other aspects, there are provided apparatus comprising means configured to carry out the steps of the method as described above. In another aspect, there is provided a computer program comprising machine readable instructions stored thereon arranged to cause a programmable device to carry out the steps of the method as described above.

BRIEF DESCRIPTION OF THE DRAWINGS

Specific embodiments of the invention will now be described, purely by way of example, with reference to the accompanying drawings in which:

FIG. 8, which comprises

DETAILED DESCRIPTION OF EMBODIMENTS

Figure 1:
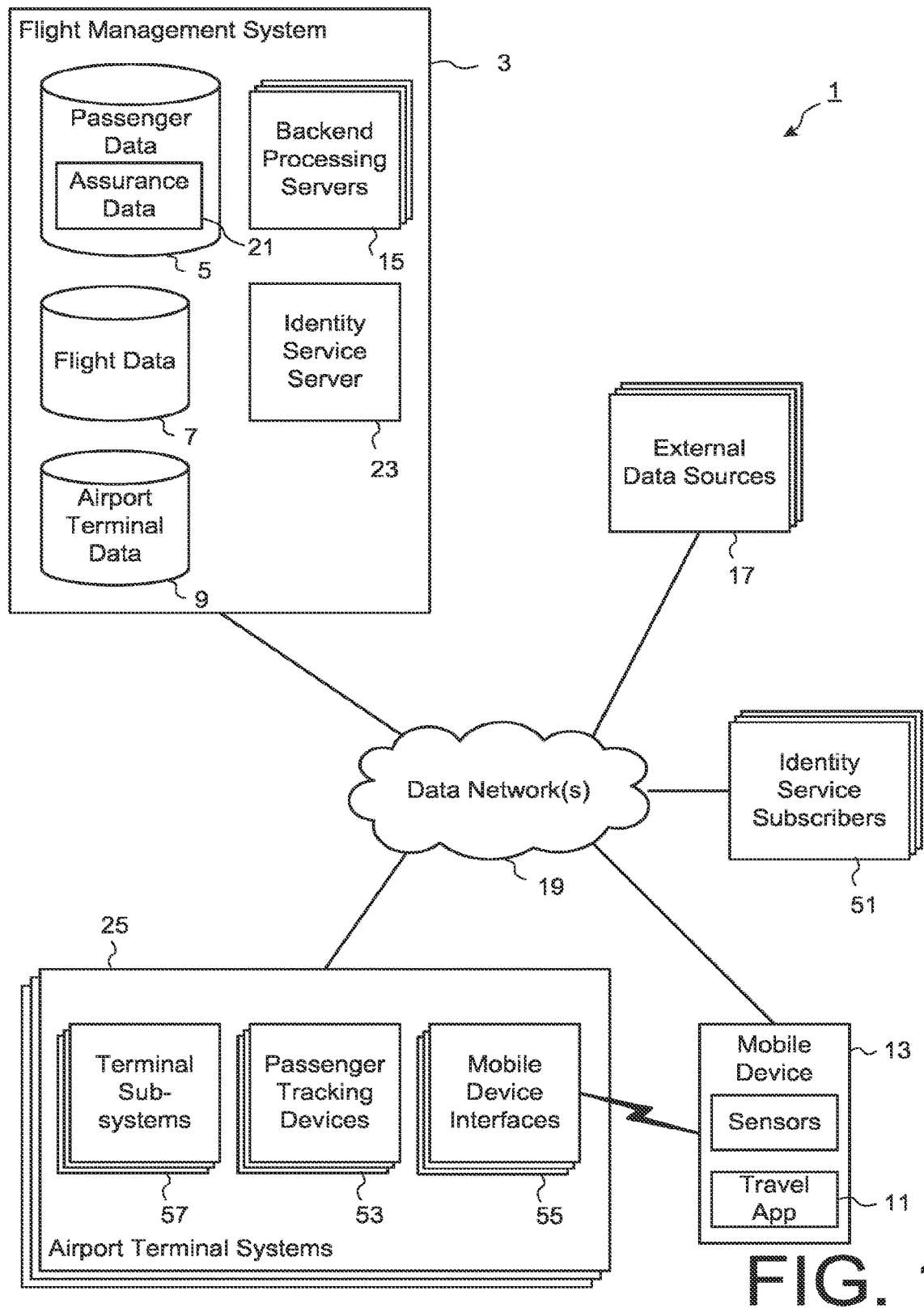
FIG. 1 is a schematic diagram of an identity service system according to an embodiment of the invention.

FIG. 1 shows schematically the elements of an identity service system 1 in an embodiment of the invention that relates to commercial air travel. Aspects of the invention may be applicable to other travel environments. At least some of the elements are optional, at least for certain applications.

In this embodiment, the system tracks an assured position of a passenger along a travel path based on input data associated with the passengers that is received from one or more data sources. The system maintains variable assured data for the passengers and is able to dynamically respond to authentication requests, for example from identity service subscribers, and to generate authentication responses based on varying levels of assurance. Specific examples and applications will be described below.

In the system 1 shown in FIG. 1, a flight management system 3, or more generally a service, has access to passenger data 5, flight data 7 and airport terminal data 9, for example from one or more local and/or remote databases.

The passenger data 5 includes details associated with the passenger and one or more booked or purchased flights that are registered with the flight management system 3. The passenger data 5 may also include biometric details including physiological characteristics such as height, weight, fingerprint, palm veins, face recognition, DNA, palm print, hand geometry, iris recognition, retinal odour/scent, etc., and behavioural characteristics such as gait, voice, style of clothing, etc. The passenger data 5 may also include personal details such as age, gender, biomarkers, health status, and preferences, such as dietary requirements, sleeping habits etc. The passenger data can also include other elements identifying the journey type (such as business or leisure travel) and/or the size and composition of other traveling members of an associated group of passengers, which can be used by the system 1 to further determine and update the assurance level for the passenger.

The flight data 7 is linked to the passenger data 5 and may include data relating to flights that the passenger has booked, checked in for, or boarded. The flight data 7 may also include the timing and duration of the flight, as well as the departure and arrival points of the flight, and information of any connecting flights. The flight data 7 may also include information associated with in-flight aspects, such as meal and/or cabin lighting schedules for the specific flight, as well as information associated with offers for the passenger, such as available flight upgrades. The airport terminal data 9 may include data relating to departure and arrival airport terminals of the flights that the passenger has booked or purchased. The terminal data 9 may also include current and anticipated information of assigned gates and flight boarding status, assigned baggage claim belts or areas, and flight transfers, terminal maps and information on services and locations within and around the terminal.

The passenger data 5, flight data 7 and airport terminal data 9 may be provided and updated by, for example, user input within a travel app 11 running on the passenger's mobile device 13, or via one or more interfaces to respective backend processing servers 15 of the flight management system 3, associated with sub-systems such as flight booking, purchasing (purchase activity), CRM, loyalty, personalization and operations. The flight management system 3 is also connected to a plurality of external data sources 17 via one or more data networks 19. The external data sources 17 may be associated for example with third-party services such as a travel planning service, a flight booking service, a social media or networking service, a financial institution, etc. Such third-party services are well-known and readily available from one or more vendors, for example via respective APIs and/or data subscription interfaces. The external data sources 17 may also include one or more on-board systems located on an aircraft, providing measured and tracked data relating for example to the airplane and travel environment, such as air pressure, radiation, humidity, hydration, engine noise, etc. The passenger data 5, flight data 7 and airport terminal data 9 may be additionally or alternatively provided or updated from the one or more external data sources 17.

The passenger data 5, flight data 7 and/or airport terminal data 9 may also be stored in the passenger's mobile device 13, and may be updated when the travel app 11 is connected to the server 3.

The data network 19 may be any suitable data communication network or combination of networks, such as a wireless network, a local- or wide-area network including a corporate intranet or the Internet, using for example the TCP/IP protocol, or a cellular communication network such as Global System for Mobile Communications (GSM), General Packet Radio Service (GPRS), Code Division Multiple Access (CDMA), CDMA2000, Enhanced Data Rates for GSM Evolution (EDGE), Evolved High-Speed Packet Access (HSPTA+), Long Term Evolution (LTE), etc.

The passenger data 5 also includes assurance data 21 determined, maintained and used by an identity service server 23 of the flight management system 3 to provide the improved identity service. In this embodiment, the assurance data 21 defines an assurance level of the passenger, determined by the identity service server 23 based on data received from one or more data sources along a travel path associated with the passenger's booked journey, such as passenger data 5, flight data 7, airport terminal data 9 and/or data received from one or more airport terminal systems 25, the passenger's mobile device 13, and one or more other external data sources 17. For example, the assurance level of a passenger may be tracked along the travel path from an origin to an intended destination, as data is received to verify that the passenger has passed predefined checkpoints or key stages of the travel path, such as home, travelling to the departure airport, arrival at the departure airport terminal, progress through the departure terminal, on-board the aircraft, arrival at the destination airport, etc.

In this embodiment, the airport terminal systems 25 include passenger tracking devices 53 and mobile device interfaces 55 that are located within the associated airport terminal, such as cameras, beacons or multi-purpose interactive stations configured to detect and recognise a passenger and/or passenger's mobile device 13. The airport terminal systems 25 may also include one or more terminal sub-systems 57 associated with respective airport terminal operations, such as check-in, security, customs, gate management, traffic flow, etc. Typically, these terminal sub-systems 57 may involve verification and/or authentication of the identity of the registered passenger at various stages or checkpoints throughout the airport terminal, for example verification that the passenger is in possession of his or her travel document (such as a passport, visa, national identity card, etc.). Each terminal sub-system 57 may be configured to generate and provide data representative of a recorded outcome at the associated stage or checkpoint after the identity check, such as data indicating that the passenger has boarded a flight, has flown, or was denied check-in or boarding. Verification may be determined by an automated passport scanner terminal of a terminal sub-system 57.

Figure 2:
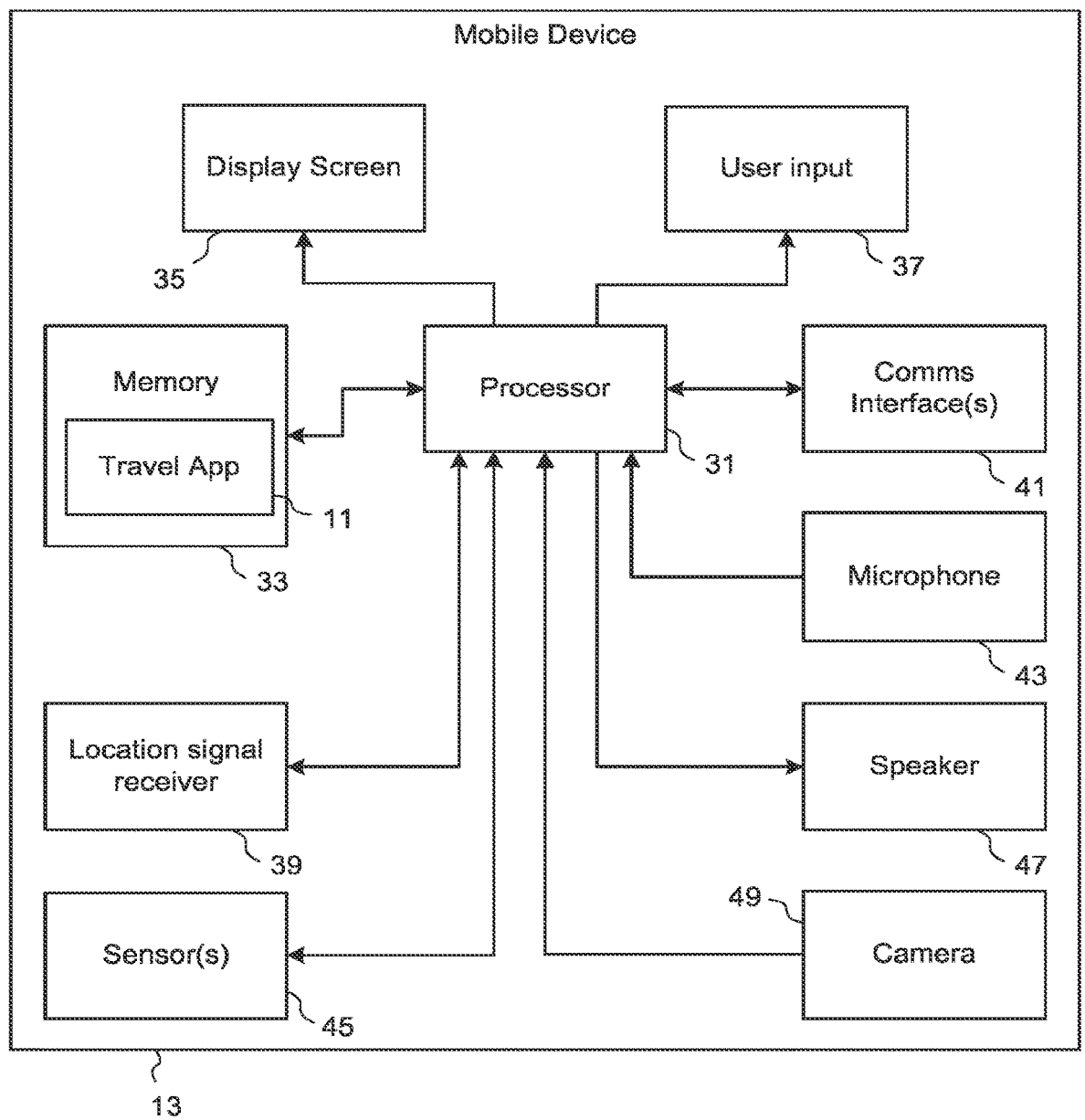
FIG. 2 is a schematic diagram of a mobile device for use in embodiments of the invention.

The mobile device 13 may be any portable electronic computing device, such as a smartphone, tablet, smart watch, PDA (Personal Digital Assistant), a Google Glass™ wearable device, or the like. FIG. 2 is a schematic diagram of one such exemplary mobile device 13, having a processor 31, memory 33, a display screen 35, user input module 37, a location signal receiver 39 and communications interface(s) 41. The location signal receiver 39 may be a GPS based receiver for determining a geolocation of the mobile device 13. The mobile device 13 may also include one or more of: a microphone 43, one or more sensors 45, a speaker 47 and a camera 49. The travel app 11 may be downloaded and installed to the memory 33 of the mobile device 13, and may require registration of the passenger with a backend processing server 15 via the app, or secure log-in to the app by an existing passenger registered with the flight management system 3. The travel app 11 may be configured to run in the background, to collect and provide information to the flight management system 3 on an on-going basis, and to receive and process push updates and event triggers from the flight management system 3. The travel app 11 may also enable the passenger to interact with the flight management system 3, for example to retrieve flight data 7, book and purchase new flights, access passenger data 5, etc.

The identity service server 23 is also configured to process authentication requests in data messages, such as identity request data tokens, received from identity service subscribers 51 via the data network 19. Each identity service subscriber 51 may be associated with an external data processing and/or control entity, such as a government system, a financial system, a delivery company, an enterprise work system, an educational system, a website requiring verification of a registered user for log-in to the service, etc. Airport terminal sub-systems 57, such as the such as sub-systems that process verification and/or authentication of a passenger for check-in, security, customs, passenger traffic flow, access control through physical gates and/or barriers, etc. may also be configured as identity service subscribers 51 to request authentication of users by the identity service server 23. Each identity service subscribe 51 may be a registered customer of the identity service server 23. Thus, each airport terminal sub-system 57 may be configured to determine and output a response for the associated stage or checkpoint, based on verification by the identity service server 23 that the passenger's dynamic assurance level is at or above a required level. In this way, a more streamlined and seamless passenger experience may be provided since subsequent airport terminal sub-systems 57 can effectively leverage the assurance level of the passenger as tracked along the travel path to simplify the verification and authentication process for that passenger at respective subsequent stages or checkpoints.

Figure 3:
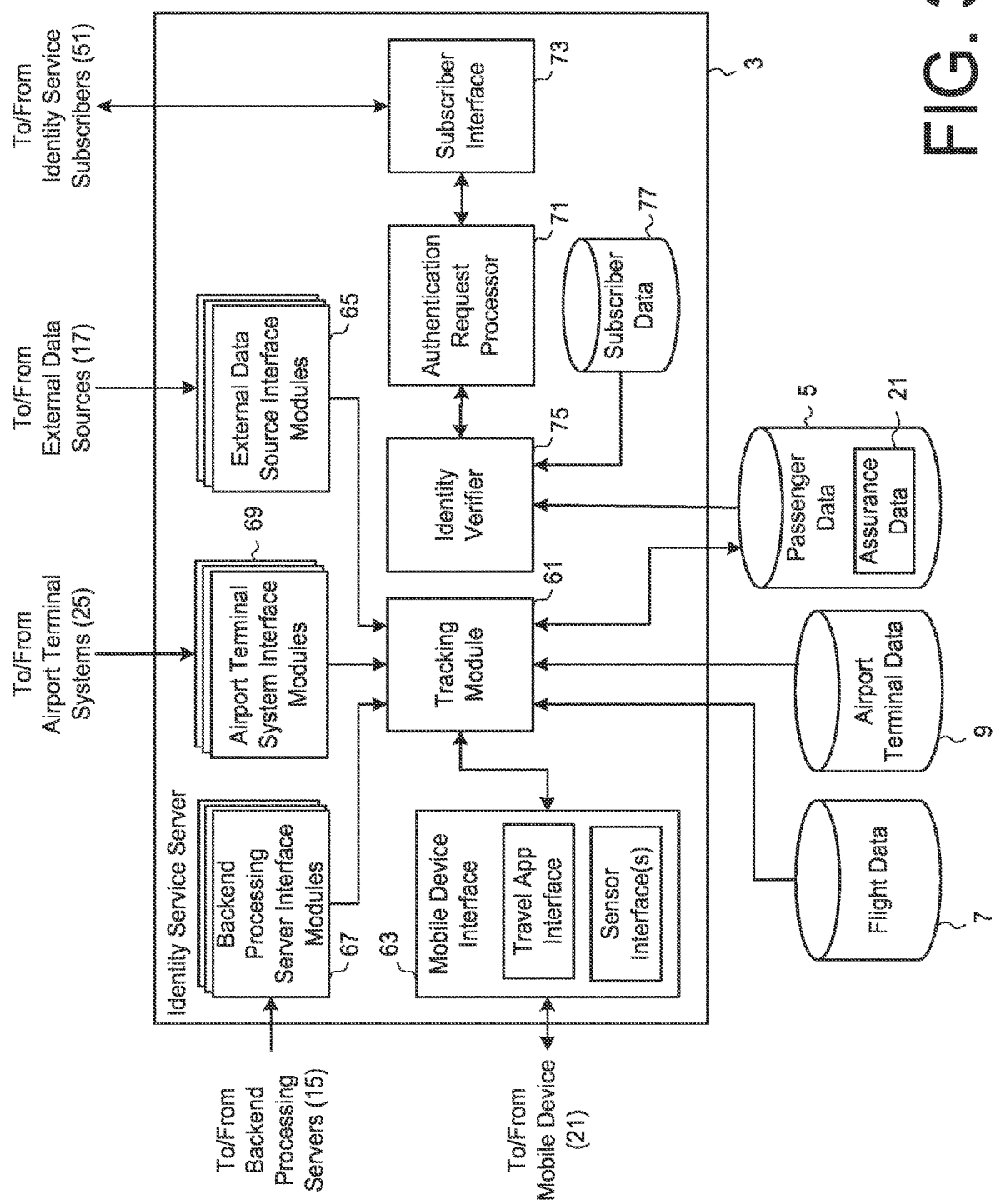
FIG. 3 is a schematic diagram of the identity service server in FIG. 1 according to an embodiment.

FIG. 3 is a schematic diagram illustrating the processing modules of the identity service server 23 according to an embodiment. The server 23 includes a tracking module 61 for maintaining the assurance data 21 of passengers registered with the flight management system 3, for example by tracking a current or last known position of the registered passengers along respective travel paths. The tracking module 61 processes data received from one or more data sources to determine a positive or negative impact to a passenger's assurance data 21, as will be described in more detail below. The tracking module 61 may also process data received from one or more data sources to determine an assured position of the passenger along the travel path, and to determine the dynamic assurance level 21 based on the verified position.

The data sources may be one or more of passenger data 5, flight data 7, airport terminal data 9, data from the passenger's mobile device 13 via a mobile device interface 63, data from one or more external data sources 17 via respective interface modules 65, data from one or more backend processing servers 15 via respective interface modules 67, and/or data from one or more airport terminal systems 25 via respective interface modules 69, such as passenger tracking devices 53 within an airport terminal and mobile device interfaces 55 for wireless data communications with passenger mobile devices 13 over near-field communications (NFC), Bluetooth®, etc. The tracking module 61 may also generate and transmit requests for predefined data elements to verify the determined position and/or the identity of the passenger at the current or last known position, for example by an identity token from the mobile device 13, airport terminal systems 25 and/or external data sources 17, which may be a self-assertion or a ticket or boarding pass identifier as a lower form of assurance, or a cryptographic biometric token as a higher form of assurance.

The identity service server 23 also includes an authentication request processor 71 configured to process authentication requests, such as identity authentication request tokens, received from identity service subscribers 51 via a subscriber interface 73, and to generate authentication responses based on verification of the passenger's identity using an identify verifier 75. In this embodiment, the identity verifier 75 compares the stored assurance level 21 of the passenger to a minimum required assurance level of the identity service subscriber 51 and/or authentication request, when responding to a received authentication request, to determine whether the minimum assurance level is met. Predefined minimum assurance levels associated with the identity service subscribers 51 may be stored in an identity subscriber database 77.

Tracking and Authentication Process

A description has been given above of the components forming part of the identity service system 1 of this embodiment. A detailed description of the operation of these components in this embodiment will now be given with reference to the flow diagrams of FIG. 4 for an example computer-implemented process of tracking a passenger and maintaining dynamic assurance data, and FIG. 5 for an example computer-implemented dynamic authentication process, using the identity service server 23. Reference is also made to FIG. 6, schematically illustrating exemplary key stages along a simplified travel path, and associated assurance scores and assurance levels that are determined by the identity service server 23.

Figure 4:
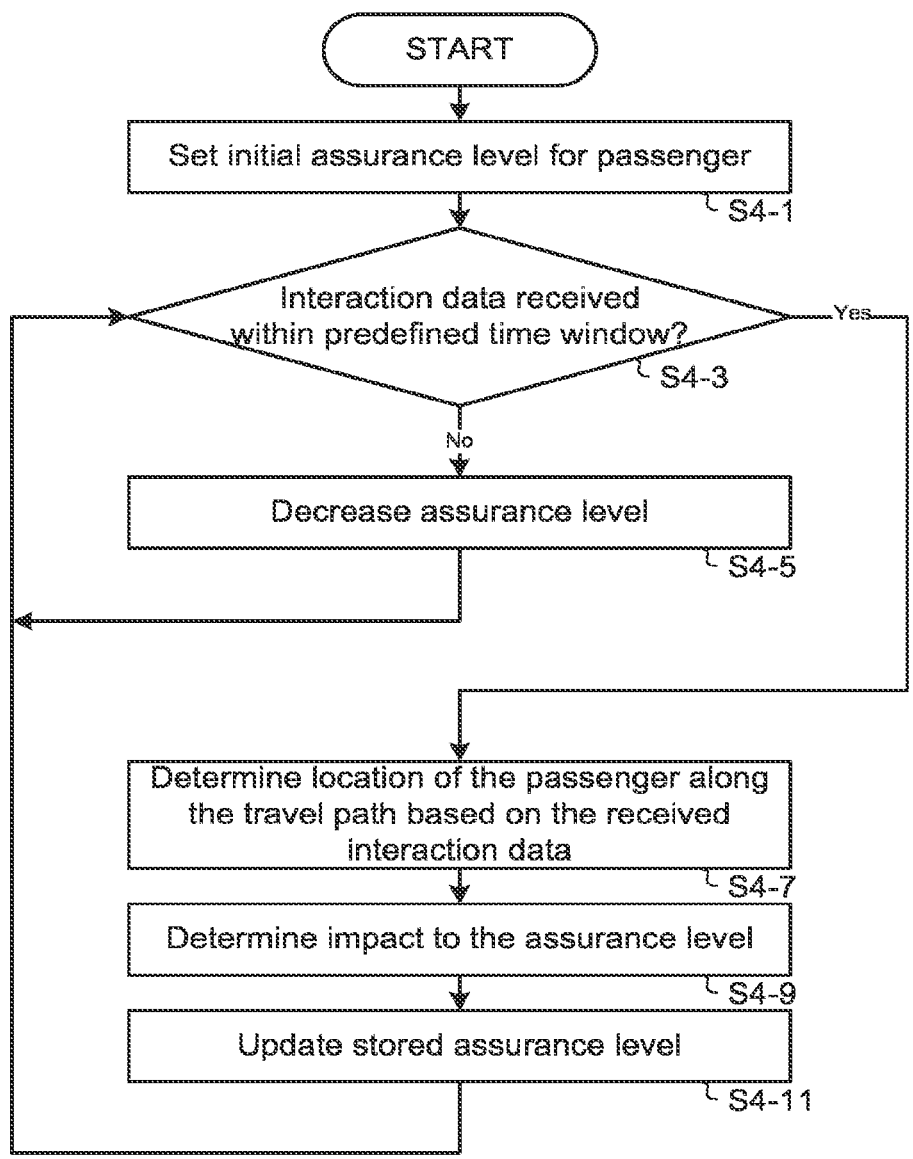
FIG. 4 is a flow diagram illustrating processing steps performed by the identity service server of FIG. 3 to track a passenger and maintain dynamic assurance data according to an embodiment.

As shown in FIG. 4, the assured tracking process begins at step S4-1, where the tracking module 61 of the identity service server 23 may set an initial assurance level in the stored assurance data 21 of the registered passenger. Typically, a newly registered passenger may be assigned the lowest possible assurance level. Alternatively, a null assurance level may be defined as the lowest possible level. As yet another alternative, a higher initial or baseline assurance level may be defined for particular registered passengers, for example in response to determination that predefined criteria are met, such as having a minimum membership tier in a frequent flyer programme.

At step S4-3, the tracking module 61 monitors for passenger interactions with the identity service system 1 within a predefined elapsed time from a previous identified interaction, or from initialisation of the assurance level 21 at step S4-1 where applicable. The elapsed time, or time window, may be predefined for the identity service system 1 based on an associated level of trust or confidence of the service. For example, a time window of thirty days may be defined for a typical service level whereas a time window of 24 hours may be defined for a stricter service level. Accordingly, if it is determined at step S4-3 that interaction data is not received within the predefined time window, then the tracking module 61 may be configured to decrease the stored assurance level 21 of the registered passenger at step S4-5, for example by a predefined value or amount (e.g. a decay rate). Alternatively, the tracking module 61 may be configured to incrementally adjust the stored assurance level 21 over the predefined time window, for example by decreasing the stored assurance level 21 by a predefined amount at predefined intervals. In this way, the assurance level 21 of a registered passenger may be dynamically decayed over time, in the absence of interactions by the passenger or mobile device 13 with the flight management system 3. Processing returns to step S4-3 where the tracking module 61 continues to monitor for passenger interactions with the identity service system 1, for example within a new predefined time window.

On the other hand, when it is determined at step S4-3 that interaction data has been received within the predefined time window, then at step S4-7, the tracking module 61 may determine a position of the passenger along the travel path, based on the received interaction data. The received interaction data associated with a registered passenger may include one or more of:

interactions with the backend processing servers 15, interactions with one or more airport terminal systems 25, including processing sub-systems 57 such as check-in, security, customs, gate management, traffic flow, etc., tracking data from the passenger's mobile device 13 such as the current or last-known geographical location of the passenger or the passenger's mobile device 13 from a location signal receiver, biometric details from one or more biometric sensors, environmental attributes from one or more environmental sensors, etc., passenger tracking data from tracking devices 53 within an airport terminal, such as cameras, beacons or multi-purpose interactive stations configured to detect and recognise a passenger, for example based on captured and processed image data of the passenger, interactions by the passenger with an interactive station and/or via data communicated to and from the mobile device 13, etc., and interactions with passenger mobile devices 13 via mobile device interfaces 55.

The tracking module 61 may compare the data types or categories of the received data to a predefined look-up table or set of rules, in order to determine a corresponding location along a travel path. Optionally, the assurance data updater may verify the determined position, for example by comparing data received from particular external data sources 17, such as measured and tracked data relating for example to the airplane and travel environment, against expected values of those data elements relative to an estimated position of the registered passenger along the travel path. As another example, the assurance data updater may verify the determined position by determining that a predefined minimum number of particular data elements associated with a key stage are received from the one or more data sources, or by automatically requesting and retrieving one or more additional data elements associated with the determined key stage.

FIG. 6 is a schematic illustration of an exemplary plurality of predefined key stages or checkpoints along one particular travel path, with exemplary associated assurance scores calculated by the identity service server 23. As shown in FIG. 6, the exemplary travel path includes a sequence of six predefined key stages, corresponding to respective identifiable locations along the exemplary travel path: "Discovery", "Purchase", "Travel to Airport", "Departure Terminal", "On-Board" and "Arrival Terminal". In this simplified example, each predefined key stage may be identified by the tracking module 61 in response to receiving data associated with one or more of the following data elements, from respective data sources, for example in response to interactions by the passenger via a suitable computing device, and/or the passenger's mobile device 13 with associated systems and sub-systems:

| Received Data | Data Source(s) | Associated Key Stage |
|---|---|---|
| Successful log-in to flight booking sub-system (website) and registered credentials | Backend processing server | Discovery |
| Additional verification for flight purchase transaction (e.g. payment card details, travel document data) | Backend processing server | Purchase |
| Geolocation; Taxi booking confirmation | Mobile device; Third party data source | Travel to Airport |
| Check-in status and confirmation; Bag screening status and results; Bag drop status and confirmation; Security check status and confirmation; Immigration check status and confirmation; Lounge access and departure; Gate arrival and status | Airport terminal systems; Backend processing server | Departure Terminal |
| Wellness data; Flight location and status | Mobile device; Backend processing server | On-Board |
| Flight arrival data; Immigration check status and confirmation; Customs check status and confirmation; Arrival services status | Airport terminal systems; Backend processing server | Arrival Terminal |

In addition to the above examples of received data, the tracking module 61 can request and receive supplemental biometric and tracking data associated with the passenger, for example from one or more sensors of the passenger's mobile device 13. This supplemental biometric and tracking data may be used to further verify or corroborate the determined location along the travel path. For example, sensor data from the mobile device 13 may be used to confirm that the registered passenger is in possession of his or her mobile device 13 at each of the predefined key stages. The tracking module 61 may additionally be configured to process the received interaction data to determine changes to physiological and/or behavioural traits associated with the registered passenger, which may be used to provide further aspects of verification.

Referring back to FIG. 4, at step S4-9, the tracking module 61 determines the dynamic impact to the passenger's stored assurance level 21 based on the received interaction data. The dynamic impact may be determined as an increase or maintenance of the stored assurance level 21 to or at a predefined level, for example based on a classification of the type of received interaction data and/or the associated determined location along the travel path. For example, received interaction data such as confirmation of possession of that passenger's travel document (e.g. passport) by the correct owner, or biometric verification at an authentication device within an airport terminal, may be associated with verification of the passenger's identity at a high standard and suitable to update that passenger's assurance level 21 to the highest level. On the other hand, receipt of data confirming successful log-in to a website for flight bookings may be associated with the lowest assurance level 21 since the log-in process at best verifies a basic set of registered user details to allow access to the service.

The table below set outs a set of exemplary adjustment rules following from the above examples of received interaction data:

| Received Data | Associated Data Type(s) | Impact to Assurance Level |
|---|---|---|
| Successful log-in to flight booking sub-system (website) with registered credentials; Cookies; Device ID, IP address of access device | Basic registered user details and basic machine/network identifiers | Increase to/maintain at Level 3 |
| Additional verification for flight purchase transaction (e.g. payment card details, travel document data) | Verifiable registered user details | Increase to/maintain at Level 2 |
| Geolocation; Taxi booking confirmation | Physical geolocation and location verification | Increase to/maintain at Level 2 |
| Check-in status/confirmation; Bag screening results; Bag drop status/confirmation; Security check status/confirmation; Immigration check status/confirmation; Lounge access and departure; Gate arrival and status | Verified identity (e.g. possession of travel document by correct owner; biometric verification) at a confirmed location in the terminal | Increase to/maintain at Level 1 |

-continued

| Received Data | Associated Data Type(s) | Impact to Assurance Level |
| --- | --- | --- |
| Wellness data; Flight location and status | Location verification | Increase to/maintain at Level 1 |
| Flight arrival data; Immigration check status/confirmation; Customs check status/confirmation; Arrival services status | Verified identity at a confirmed location in the terminal | Increase to/maintain at Level 1 |

It will be appreciated that the above data types and associated impacts are provided purely as simplified examples and the number and complexity of rules for determining impact based on received interaction data may depend on the particular travel environment and available associated data sources. Additionally, the predefined dynamic impact may be a negative impact that decreases the assurance level to a predefined lower level or by a dynamic amount, for example depending on the nature and severity of a negative check-in or bag screening process.

At step S4-11, the tracking module 61 updates the stored assurance level 21 of the passenger based on the determined dynamic impact. Alternatively or additionally, a maximum assurance level of the passenger may be computed by comparing a calculated assurance score to a predefined scale of assurance levels. In the example shown in FIG. 6, a predefined scale of low, medium and high assurance levels is schematically illustrated, labelled as assurance levels '3' to '1', respectively. Similar to the exemplary rules set out in the table above, received interaction data associated with the "Discovery" key stage may be processed by the tracking module 61 to increase the assurance threshold level to the low level '3'. The assurance level may start to decay in the absence of interaction data after a predefined time window, as schematically illustrated in FIG. 6. Subsequently, received interaction data associated with the "Purchase" and "Travel to Airport" key stages may be received and processed by the tracking module 61 to increase the assurance level to the medium level '2'. Finally, received interaction data associated with the "Departure Terminal", "On-Board" and "Arrival Terminal" key stages may be received and processed by the tracking module 61 to increase and maintain the assurance level 21b to a high level '1'.

As shown in FIG. 4, after the tracking module 61 has updated the stored assurance level at S4-13, processing returns to step S4-3 where the process of tracking the passenger and maintaining associated assurance data is repeated, to further update the assurance level of the passenger in response to the tracking module 61 receiving additional or updated data associated with that passenger.

Figure 5:
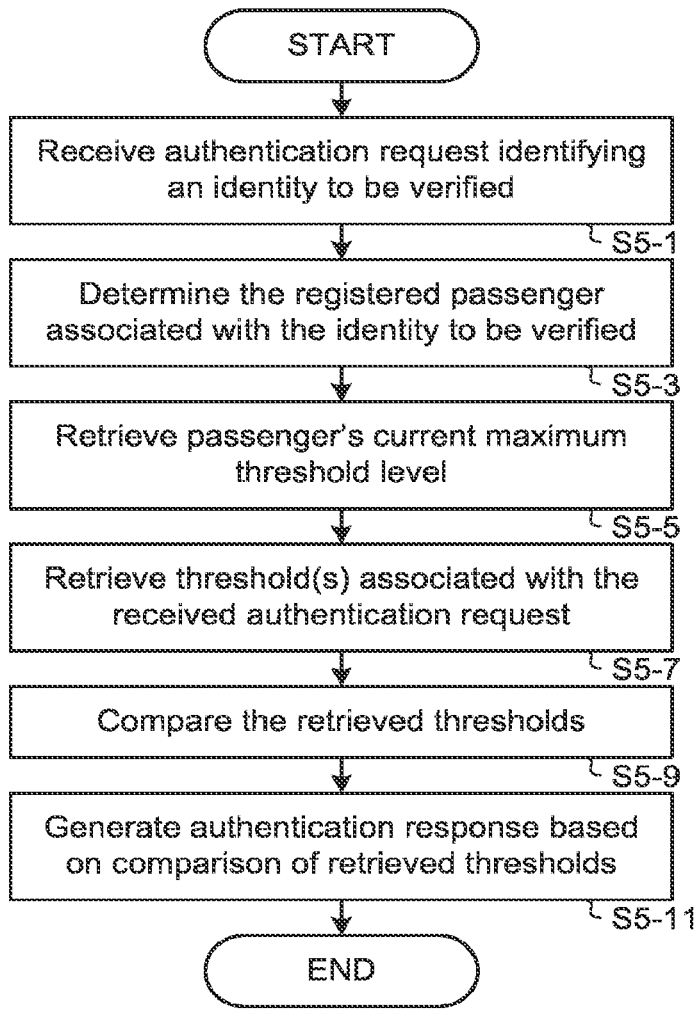
FIG. 5 is a flow diagram illustrating processing steps performed by the identity service server of FIG. 3 to process an authentication request according to an embodiment.
Figure 6:
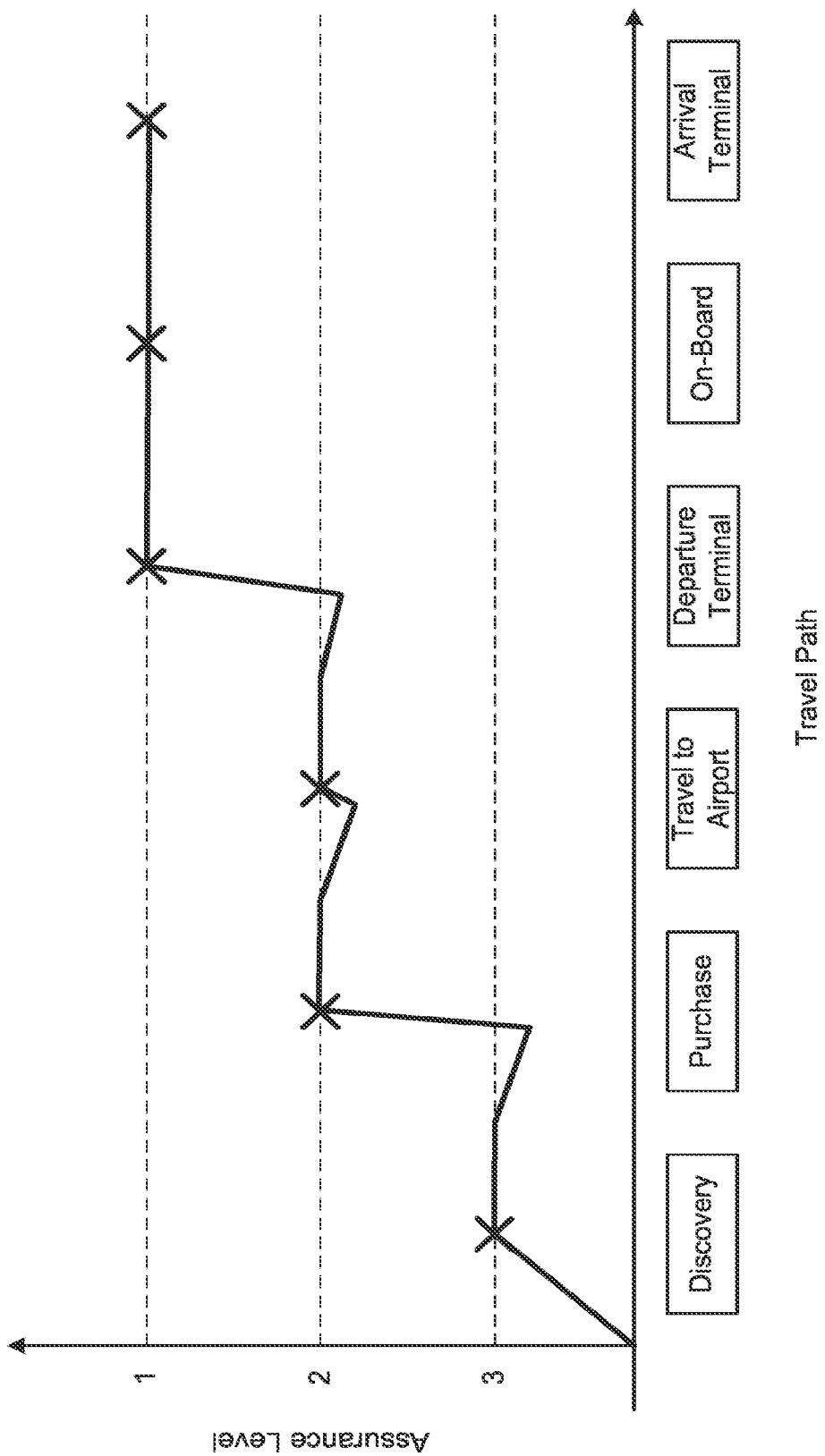
FIG. 6 is a schematic illustration of exemplary key stages along a simplified travel path, and associated assurance scores and assurance thresholds that are determined by the identity service server of FIG. 3.

Referring now to FIG. 5, the dynamic authentication process of the present exemplary embodiment begins at step S5-1, where the identity service server 23 receives an authentication request from an identity service subscriber 51 via a subscriber interface 73. The authentication request may be an authentication token include data identifying the request type, an identity to be verified, and a format for the authentication response. At step S5-3, the authentication request processor 71 processes the received request to determine the registered passenger associated with the identity to be verified. For example, the registered passenger may be identified by a common unique identifier, such as a registered user name, e-mail address, mobile directory number (MDN), device identifier, etc. Alternatively, the authentication request processor 71 may be configured to prompt the passenger for input to identify the corresponding data record in the passenger database 5.

At step S5-5, the identity verifier 75 receives an instruction from the authentication request processor 71 to verify the identity of the registered passenger associated with the authentication request. In response, the identity verifier 75 retrieves the passenger's current assurance level 21 from the passenger database 5. At step S5-7, the identity verifier 75 retrieves the minimum required assurance level or levels associated with the received authentication request and/or the requesting identity service subscriber 51. For example, a minimum assurance level associated the identity service subscriber type may be retrieved from the subscriber database 77. As another example, the received authentication request may include data identifying a minimum assurance level required for verification of the identity.

At step S5-9, the identity verifier 75 compares the passenger's current assurance level with the minimum assurance level associated with the authentication request, to determine if a positive response can be generated for the authentication request. For example, if the identity verifier 75 determines that the passenger's current assurance level is equal to or exceeds the minimum assurance level associated with the authentication request, then the authentication request processor 71 generates a positive authentication response at step S5-11. The authentication request processor 71 may generate a negative authentication response when the minimum assurance level associated with the authentication request is not met by the passenger's assurance level.

Alternatively or additionally, a plurality of assurance levels may be associated with a particular received authentication request and/or requesting identity service subscriber 51, each assurance level being associated with a respective positive authentication response. The positive authentication response may instead or additionally include data identifying the particular assured level of identity verification that is met by the registered passenger at the time of the request.

At step S5-13, the authentication request processor 71 transmits the generated response back to the identity service subscriber 51, as a response to the received authentication request.

Dynamic Gate Control

A further exemplary embodiment will now be described with reference to the schematic block diagram of FIG. 7, using corresponding reference numerals to those of preceding figures where appropriate for corresponding elements. Reference is also made to FIGS. 8A and 8B, schematically illustrating exemplary access and/or flow control arrangements with one or more control mechanisms 91, such as gates, barriers, lights, displays, speakers, etc., to direct a passenger through a controlled point in response to verification of the passenger's identity according to embodiments of the present invention.

Figure 7:
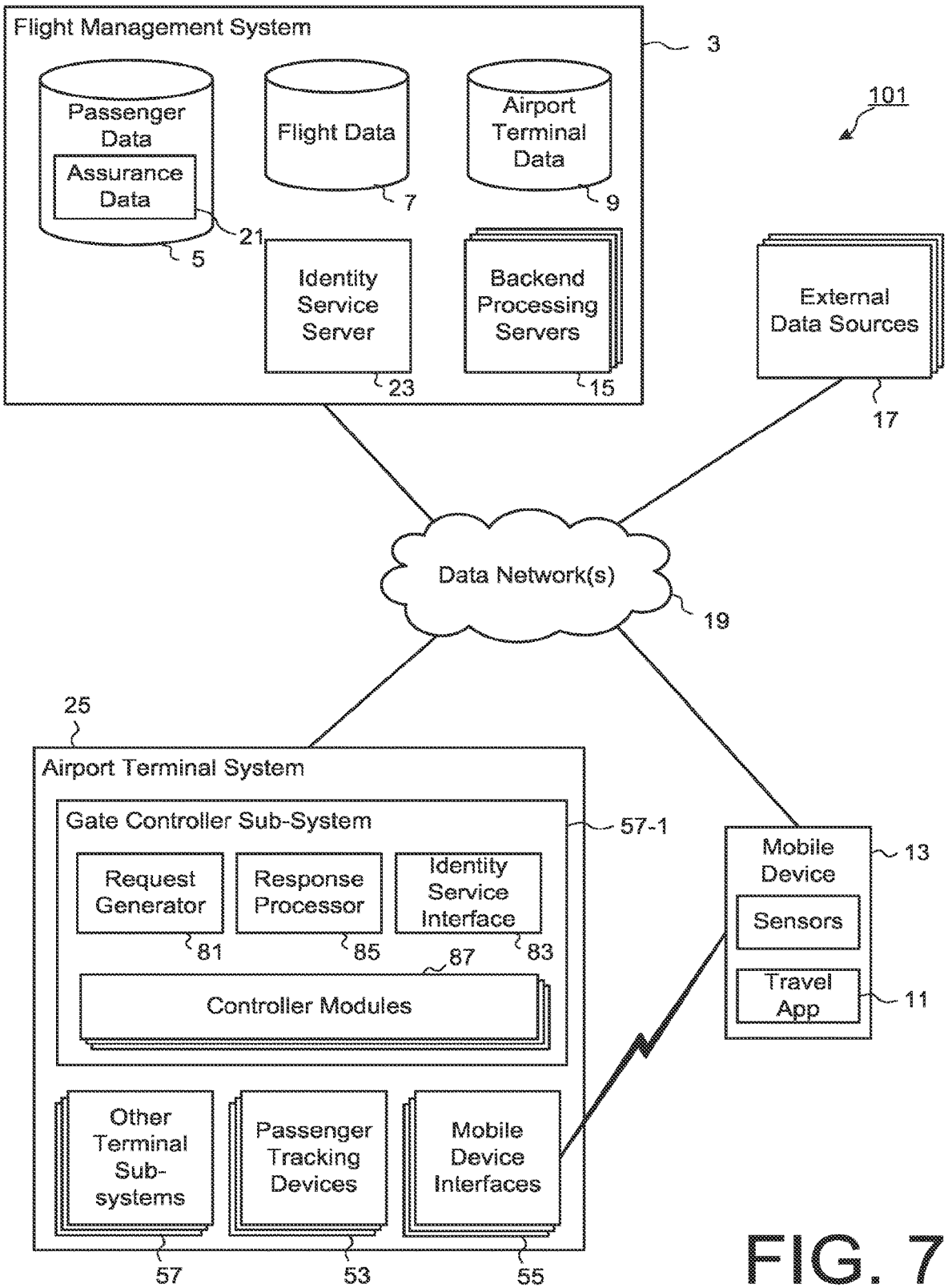
FIG. 7 is a schematic diagram of an identity service system according to another exemplary embodiment of the invention.
Figure 8A:
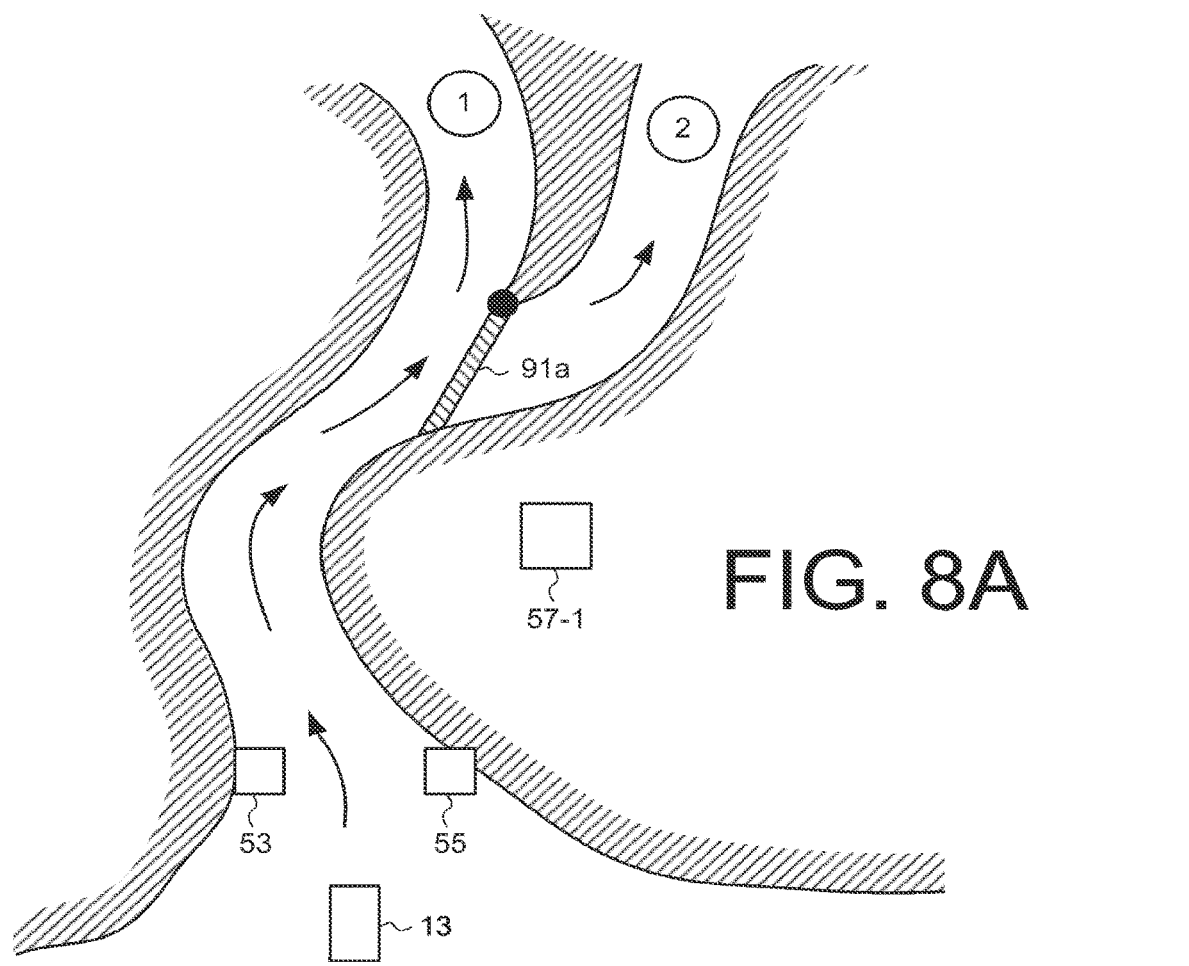
FIGS. 8A and 8B, is a schematic diagram illustrating exemplary access and/or flow control arrangements with one or more control mechanisms to direct a passenger through a controlled point.
Figure 8B:
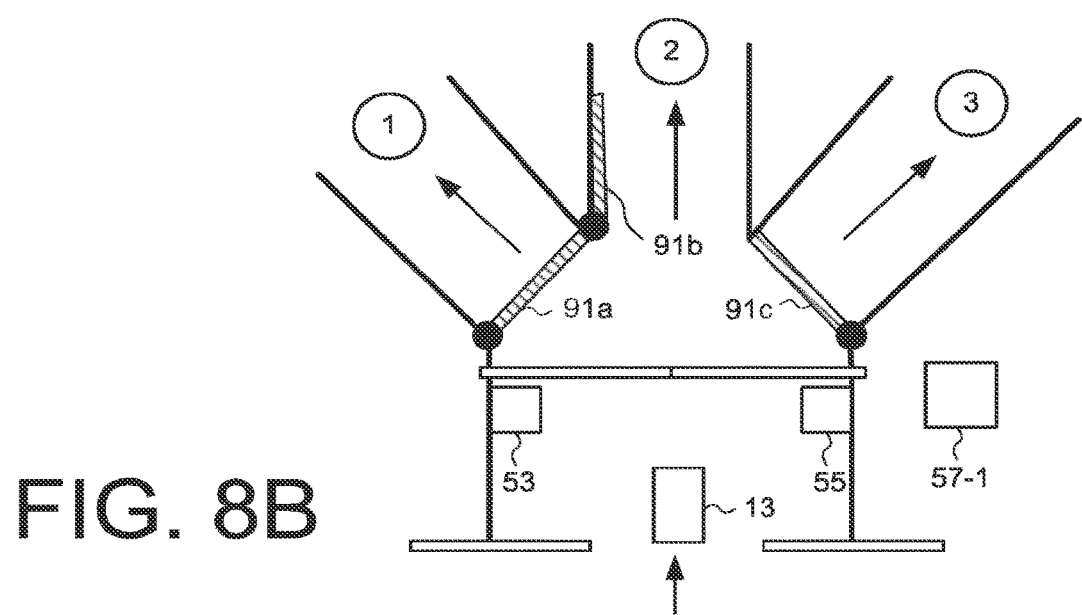

As shown in FIG. 7, the identity service system 101 includes an airport terminal system 25 with an access control sub-system 57-1 for controlling operation of the one or more control mechanisms 91 via respective one or more controller modules 87. The gate controller sub-system 57-1 includes a request generator module 81 that generates authentication requests and transmits the requests to the identity service server 23 via the data network 19 and an identity service interface 83, such as an API. The authentication request includes data identifying the passenger at the controlled point, for example from one or more passenger tracking devices 53 and/or a mobile device interface 55 located at an entry/assessment pathway or region of the controlled point. The gate controller sub-system 57-1 also includes a response processor 85 that processes authentication responses received from the identity service server 23, via the data network 19 and an identity service interface 83. The response processor 85 transmits control data to the one or more controller modules 87, such as gate motor actuator(s), lighting controller(s), display controller(s), speaker controller(s), etc., in dependence upon the received and processed authentication response data. In this way, the gate controller sub-system 57-1 is adapted to include processing modules of an identify service subscriber 51, to enable dynamic control of a gate and/or passenger traffic flow based on assured verification of the passenger's identity by the identity service server 23.

As described above, the identity service server 23 of the flight management system 3 tracks an assured position of a passenger along a travel path based on input data associated with the passengers that is received from one or more data sources. The system maintains dynamic assurance data 21 for the passengers and is able to dynamically respond to authentication requests from the gate controller sub-system 57-1, and to generate authentication responses based on varying levels of assurance for a registered passenger.

In the exemplary embodiment illustrated in FIG. 8A, the gate controller sub-system 57-1 is configured to transmit a command to control an access mechanism 91*a*, such as a barrier, gate or movable partition, depending on the authentication response received from the identity service server 23. For example, the gate controller sub-system 57-1 may direct a registered passenger verified as having a high assurance level to a first channel or path of the controlled point, and to otherwise direct a passenger having a lower assurance level through a second channel or path, where additional data may be requested from the passenger for further verification. As described above, data identifying the assurance level associated with the gate controller sub-system 57-1 may be stored in the subscriber database 77 of the identity service server 23, or may be included in the authentication request generated by the request generator 81 of the gate controller sub-system 57-1. As illustrated in FIG. 8A, the access mechanism 91*a* may be located after a bend in the entry pathway of the controlled point, whereby each passenger may be directed in turn along a flow channel but is not made aware that a particular exit point will be determined by the sub-system 57-1 based on the passenger's identified assurance level.

In the alternative exemplary embodiment illustrated in FIG. 8B, the gate controller sub-system 57-1 is configured to control access by a registered passenger through one of a plurality of security gates, channels or pathways, each associated with a respective different assurance level. For example, the gate controller sub-system 57-1 may be configured to transmit a command to a first control barrier or gate, to direct a passenger along one channel in response to receiving a positive authentication response from the identity service server 23 including data indicating that a high assurance level is met by the registered passenger at the time of the request. On the other hand, the gate controller sub-system 57-1 may be configured to transmit a command to a second or third control barrier or gate, to direct a passenger along a respective different channel in response to receiving a positive authentication response from the identity service server 23 including data indicating that a low or medium assurance level is met by the registered passenger at the time of the request.

As yet another possible arrangement, the response processor 85 may be configured to transmit control data to one or more controller modules 87 of a one-way controlled point, for example to open a security gate 91*a* in response to receiving a positive authentication response from the identity service server 23. On the other hand, the response processor 85 may be configured to transmit control data to one or more controller modules 87, for example to output audio and/or image data indicating that the passenger is not permitted to pass through the security gate, in response to receiving a negative authentication response from the identity service server 23.

In this way, registered passengers having a high assurance level 21 may be efficiently and automatically directed through the security gate, whereas passengers requiring further verification of identity may be efficiently and automatically directed to a different channel to await further interaction with other verification systems or personnel. It will be appreciated that the response processor 85 of the gate controller sub-system 57-1 may be configured to control the flow of passengers through any number of available channels, each associated with a respective one or more assurance levels. Automatic queue management may also be improved. For example, the gate controller sub-system 57-1 may be further configured to automatically separate passengers having a low assurance level from passengers having a medium assurance level. Passengers having a medium assurance level may be directed to another computing terminal, such as a passenger tracking device 53 including a retina scanner, or another terminal sub-system 57 including an automated passport scanner terminal, for further automated verification before permitted access through the security gate. Passengers having a low assurance level may be automatically directed to a counter for interrogation by a security officer.

Computer System

Figure 9:
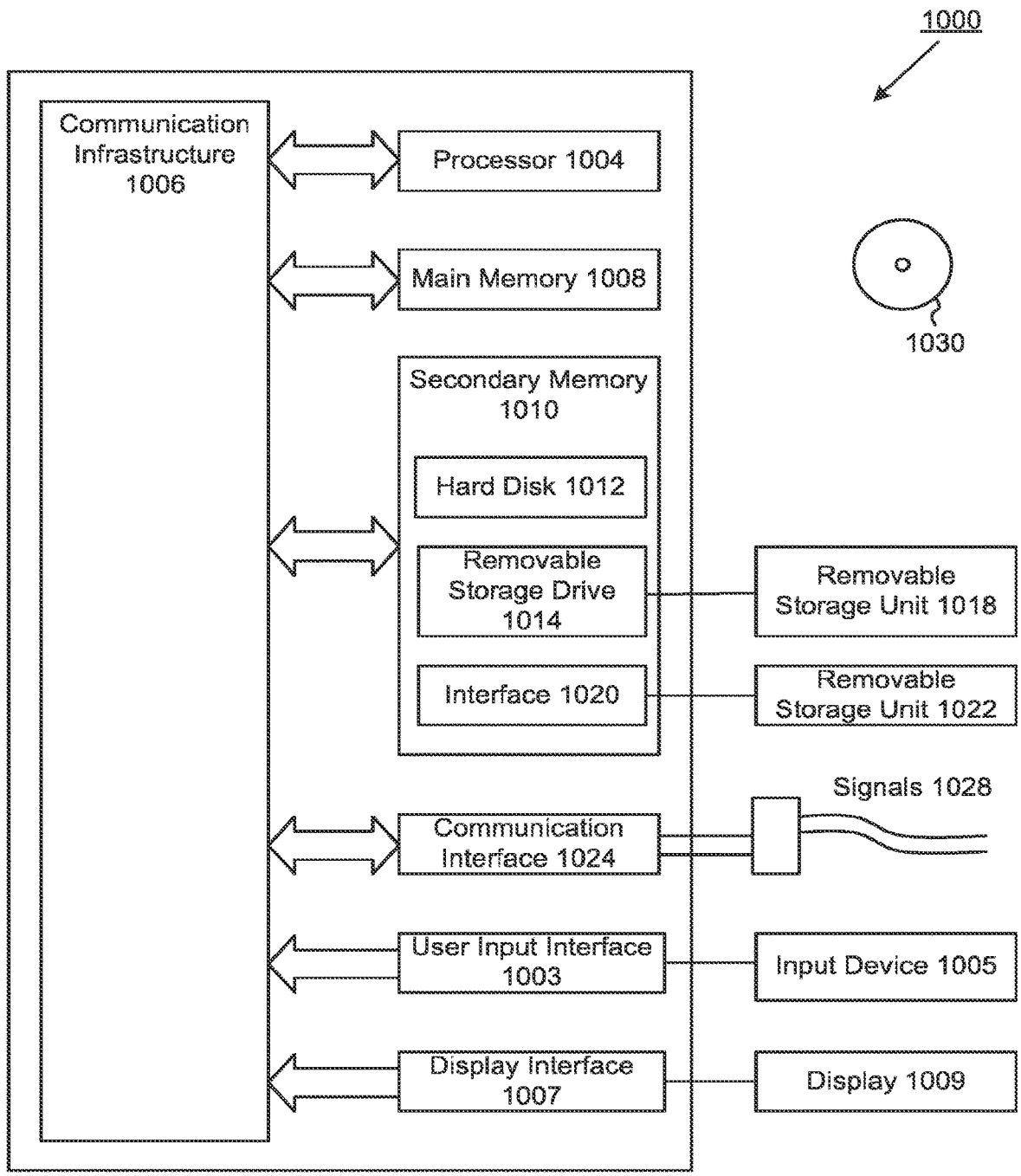
FIG. 9 is a diagram of an example of a computer system for use in embodiments of the invention.

The identity service server 3 and gate controller sub-system 57-1 described herein may comprise a computer system 1000 as shown in FIG. 9. Embodiments of the present invention may be implemented as programmable code for execution by the computer system 1000. Various embodiments of the invention are described in terms of this example computer system 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Computer system 1000 also includes a main memory 1008, preferably random access memory (RAM), and may also include a secondary memory 1010. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 10210. Communication path 10210 carries signals 1028 and may be implemented using wire or cable, fibre optics, a phone line, a wireless link, a cellular phone link, a radio frequency link, or any other suitable communication channel. For instance, communication path 10210 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement the present invention as discussed herein. Accordingly, such computer programs represent controllers of computer system 1000. Where the invention is implemented using software, the software may be stored in a computer program product and loaded into computer system 1000 using removable storage drive 1014, hard disk drive 1012, or communication interface 1024, to provide some examples.

In alternative embodiments, the invention can be implemented as control logic in hardware, firmware, or software or any combination thereof. The apparatus may be implemented by dedicated hardware, such as one or more application-specific integrated circuits (ASICs) or appropriately connected discrete logic gates. A suitable hardware description language can be used to implement the method described herein with dedicated hardware.

FURTHER ALTERNATIVES AND MODIFICATIONS

The embodiments described above are illustrative of rather than limiting to the present invention. Alternative embodiments apparent on reading the above description may nevertheless fall within the scope of the invention.

For example, in an exemplary embodiment described above, a gate controller sub-system of an airport terminal system is adapted to include functionality of an identity service subscriber, to facilitate dynamic operation of the sub-system based on the assured level of identity verification provided by the identity service server. As those skilled in the art will appreciate, other terminal sub-systems of the airport terminal system, such as queue monitoring and flow control, may be similarly adapted to function as an identity service subscriber and to provide dynamic operation based on the authentication response received from the identity service server.

In the embodiments described above, the tracking module may be configured to decrease the assurance level of the registered passenger by a defined amount or to a defined value when it is determined that interaction data is not received within the predefined time window, and to increase the assurance level by a determined amount or to a determined level based on subsequently received interaction data. As those skilled in the art will appreciate, the tracking module may apply a dynamic adjustment to one of a plurality of levels, taking into account defined aspects of the passenger data, flight data and/or airport terminal data. For example, when the tracking module determines that the passenger has recently travelled on another flight, the applied decay rate may be reduced by a defined factor and/or the level may be decreased no lower than a defined minimum level. As another example, the adjustment rules may define an increase to a higher assurance level in response to receiving interaction data associated with a passenger determined to have recently travelled on another flight. It is further appreciated that a respective time window may be defined for each predefined key stage in a passenger's travel path. In this way, the tracking module would decrease the assurance level of the passenger in response to determining that interaction data is not received from at least one data source associated with the subsequent key stage along the passenger's travel path, within the respective predefined time window.

Yet further alternative embodiments may be envisaged, which nevertheless fall within the scope of the following claims.

The invention claimed is:

1. A method of verifying the identity of a passenger associated with a mobile device and having an associated predefined travel path, the method comprising steps performed by one or more computer processors of:
   determining a location of the mobile device along a predefined travel path, from interaction data identifying an interaction between the mobile device and at least one device located at a respective point along the travel path;
   determining an assurance level of the passenger, wherein the assurance level is increased based on receiving said interaction data associated with predefined stages along the travel path, and wherein the assurance level is decreased in the absence of receiving data identifying an interaction over a predefined time window; and verifying the identity of the passenger if the determined assurance level meets a defined threshold.

2. The method of claim 1, wherein the assurance level is decreased based on the data identifying an interaction.

3. The method of claim 1, further comprising receiving said interaction data from at least one device at a point along the travel path, including data identifying the source of the interaction data.

4. The method of claim 3, further comprising verifying secure log-in by the passenger to the mobile device to enable the passenger to interact with a device at said point along the travel path.

5. The method of claim 1, further comprising determining an assured location along the travel path based at least on the determined location of the mobile device.

6. The method of claim 1, wherein the interaction data is received from one or more of an airport terminal, a beacon and an interactive terminal, configured to detect the mobile device.

7. The method of claim 1, further comprising receiving an identity verification request, the request including data identifying the passenger, and outputting a response based on the result of verifying the identity of the passenger.

8. The method of claim 1, wherein the predefined travel path includes a start location, a destination location, and at least one intermediary location.

9. The method of claim 1, wherein one or more points along the travel path are associated with a respective external data processing system.

10. The method of claim 1, wherein the mobile device is a smartphone, tablet, smart watch, personal digital assistant or wearable device.

11. The method of claim 1, further comprising receiving interaction data from one or more systems of an airport terminal, including check-in, security, customs, gate management and traffic flow data processing systems, wherein the location of the mobile device is further determined based on the received interaction data from the airport terminal systems.

12. The method of claim 1, further comprising receiving data from the mobile device including current or last-known geographical location from a location signal receiver, biometric details from one or more biometric sensors, and environmental attributes from one or more environmental sensors, wherein the location of the mobile device is further determined based on the received data from the mobile device.

13. An identity verification system for verifying the identity of a passenger associated with a mobile device and having an associated predefined travel path, comprising means for:

determining a location of the mobile device along a predefined travel path, from interaction data identifying an interaction between the mobile device and at least one device located at a respective point along the travel path;

determining an assurance level of the passenger, wherein the assurance level is increased based on receiving said interaction data associated with predefined stages along the travel path, and wherein the assurance level is decreased in the absence of receiving data identifying an interaction over a predefined time window; and verifying the identity of the passenger if the determined assurance level meets a defined threshold.

14. A non-transitory computer-readable storage medium comprising instructions which, when executed by a computer, cause an identity verification system for verifying the identity of a passenger associated with a mobile device and having an associated predefined travel path to perform the steps of:

determining a location of the mobile device along a predefined travel path, from interaction data identifying an interaction between the mobile device and at least one device located at a respective point along the travel path;

determining an assurance level of the passenger, wherein the assurance level is increased based on receiving said interaction data associated with predefined stages along the travel path, and wherein the assurance level is decreased in the absence of receiving data identifying an interaction over a predefined time window; and verifying the identity of the passenger if the determined assurance level meets a defined threshold.

* * * * *